UNITED STATES PATENT OFFICE.

LÉONCE BARBÉ, OF ST.-MAURICE, FRANCE, ASSIGNOR TO SOCIÉTÉ DES PRODUITS AZOTÉS, OF PARIS, FRANCE, A CORPORATION OF FRANCE.

PROCESS FOR GRANULATING CYANAMID.

1,394,532.  Specification of Letters Patent.  Patented Oct. 25, 1921.

No Drawing.   Application filed October 24, 1919.  Serial No. 332,977.

*To all whom it may concern:*

Be it known that I, LÉONCE BARBÉ, of 120 Grande Rue, Saint-Maurice, Seine, France, have invented a new and useful Improved Process for Granulating Cyanamid, which process is fully set forth in the following specification.

This invention relates to a process of rendering cyanamid suitable for commercial purposes.

Cyanamid in a state of powder has the disadvantage of being caustic and of containing a small quantity of carbid which renders its use harmful to plants and dangerous for man and animals.

Various processes have been tried for granulating cyanamid; they usually commence wrongly by pulverizing a naturally agglomerated material and then again seeking to agglomerate. Considerable quantities of liquor are required for this purpose which give rise to secondary products such as dicyandiamid and yield fertilizer which is poor in nitrogen by reason of losses and dilution.

This invention relates to a process which consists:

1. In coarsely dividing cyanamid.
2. In treating coarsely divided cyanamid with water, preferably in such quantity that decomposition of all the carbid is insured and also partial hydration by the formation of calcium hydroxid.
3. In granulating the product in suitable known apparatus for the mechanical division of material such as crushers, stamps, cylinder mills, etc.
4. In drying and coating such granular material by mixing the granules with the impalpable powder derived from the mechanical division, this being effected in drums, tubes or other suitable apparatus. Preferably the quantity of powder with which the granules are coated is sufficient to dry the powder.
5. In sifting into different sizes according to the needs of agriculture.

The following is an example of the manner in which the process is carried into effect.

A mass of coarsely divided cyanamid is passed into a crusher having jaws in which it is reduced to pieces the size of an egg; all the carbid is decomposed by passing the material through apparatus, allowing it to be treated with showers of water or to be steeped in water.

These pieces of cyanamid are then treated in a crusher of a type which will form as little powder as possible for a given size of granule; a battery of crushing stamps is to be preferred for this purpose.

The cyanamid thus treated is then passed into apparatus suitable for rolling the grains in powdered cyanamid, for example in drums, ball mills with their balls removed or centrifugal machines, with the object of incorporating a certain quantity of the powder and thus utilizing it.

The mixture thus obtained is then sieved in usual apparatus for the purpose of classifying the product into different sizes according to the requirements of agriculture.

Claims:

1. The process of granulating cyanamid which consists in treating coarsely divided cyanamid with water, granulating the product thus obtained and coating the granules with cyanamid powder.
2. The process of granulating cyanamid which consists in treating coarsely divided cyanamid with water to an extent that will assure the decomposition of the carbid contained therein by the formation of calcium hydroxid, granulating the product thus obtained and coating the granules with cyanamid powder.

In testimony whereof I have signed this specification in the presence of two subscribing witnesses.

LÉONCE BARBÉ.

Witnesses:
CHAS. P. PRESSLY,
FREDERIC HARLÉ.